United States Patent [19]
Kragl

[11] Patent Number: 5,434,935
[45] Date of Patent: Jul. 18, 1995

[54] INTEGRATED OPTICAL CIRCUIT HAVING ONE OR MORE WAVEGUIDES ARRANGED ON A SUBSTRATE

[75] Inventor: Hans Kragl, Ober-Ramstadt, Germany

[73] Assignee: Robert Bosch GmbH, Stuttgart, Germany

[21] Appl. No.: 167,836

[22] PCT Filed: May 15, 1992

[86] PCT No.: PCT/DE92/00402
§ 371 Date: Dec. 20, 1993
§ 102(e) Date: Dec. 20, 1993

[87] PCT Pub. No.: WO92/22839
PCT Pub. Date: Dec. 23, 1992

[30] Foreign Application Priority Data
Jun. 19, 1991 [DE] Germany ............ 41 20 198.1

[51] Int. Cl.[6] .............................................. G02B 6/12
[52] U.S. Cl. ................................ 385/14; 385/39; 385/129

[58] Field of Search ............ 385/14, 15, 39, 49, 385/129, 130, 131, 132

[56] References Cited

U.S. PATENT DOCUMENTS

| | | | |
|---|---|---|---|
| 4,070,516 | 1/1978 | Kaiser | 385/14 X |
| 4,966,430 | 10/1990 | Weidel | 385/14 |
| 5,123,078 | 6/1992 | Thomas | 385/130 |
| 5,237,434 | 8/1993 | Feldman et al. | 385/14 X |
| 5,313,535 | 5/1994 | Williams | 385/14 |

FOREIGN PATENT DOCUMENTS 2222465 3/1990 United Kingdom.

Primary Examiner—John D. Lee
Attorney, Agent, or Firm—Kenyon & Kenyon

[57] ABSTRACT

In an integrated optical circuit with waveguides applied on a substrate, a layer of high conductivity and a layer of lower index of refraction than the waveguides are arranged between the substrate and the waveguide cores. The circuit permits a favorable coupling of optoelectronic components arranged in the substrate with the waveguides and it can be manufactured by well-known methods.

14 Claims, 3 Drawing Sheets

INTEGRATED OPTICAL CIRCUIT HAVING ONE OR MORE WAVEGUIDES ARRANGED ON A SUBSTRATE

FIELD OF THE INVENTION

The present invention relates to integrated optical circuits. More specifically, the present invention relates to an integrated optical circuit having one or more waveguides arranged on a substrate and separated therefrom by a highly conductive layer.

BACKGROUND OF THE INVENTION

Integrated optical circuits comprise a substrate on which the optical structures are applied or into which the optical structures are inserted. The possibility of being able to produce optical waveguides of low attenuation is, in particular, of decisive importance here. Starting from the basic structure of a waveguide, various assemblies such as, for instance, couplers, interferometers, frequency filters and the like can be produced.

For the production of waveguides which can conduct electromagnetic waves, the propagation of the field is to be limited to a direction which is predetermined in each case by the waveguide. For this purpose, the "insulating" of the field to be conducted from the outer environment is necessary.

In optical communications, dielectric insulation means, in particular, are employed. In the so-called core region of a waveguide, there is a material which has a higher index of refraction than the material surrounding the core, i.e. the so-called wall region. As a result, the guided electromagnetic field decreases substantially exponentially, without dissipation of energy in the direction towards the wall so that such a small field strength is present at the wall boundary that the attenuation of the field which takes place there is, as a practical matter, unimportant. This type of wave guidance is frequently used not only in glass fibers but also in integrated optical waveguides.

In connection with integrated optical waveguides, a wave guidance by height profiles is furthermore known in which the dispersion is limited by lateral narrowing of the core zone. Finally, for use in active optical components there is also known for wave guidance the recovery guidance method in which a region having a higher amplification than the surrounding of the wall is produced in the core region of the waveguide.

SUMMARY OF THE INVENTION

The object of the present invention is to improve the possibility of manufacturing integrated optical circuits, and, in particular, to indicate means for the guiding and/or controlling of the field of waves which can be produced by process steps which are carried out on the substrate.

The integrated optical circuit of the present invention has the advantage that a material, the technical working of which is readily controlled, can be used for the substrate. Since the optical field is kept away from the substrate in the waveguide structures to be produced, materials which can be readily worked can be selected, without regard to their optical properties.

The layer of lower index of refraction provided in the integrated optical circuit of the present invention can be applied by known methods in view of its slight thickness. Furthermore, coupling with outdoor electric components in the substrate is advantageously possible with the integrated optical circuit of the present invention.

In the known technologies for the production of integrated optical circuits, optically transparent layers which are structured and worked in accordance with the intended function of the component are applied to the substrate. This structuring, however, is effected in a material which is selected because of its optical properties and not because of its workability. In the integrated optical circuit of the present invention, however, the structuring can take place substantially in the substrate, so that a structuring of the overlying layers is in part unnecessary. Structuring of the optical layer is, however, not ruled out with the integrated optical circuit of the present invention.

In further embodiments of the present invention, openings are provided in the layer of high conductivity for optically coupling to opto-electronic elements arranged in the substrate, or for controlling the wave guidance.

These further developments are advantageous even when the structuring takes place with respect to the waveguide itself within the region of the waveguide and not in the substrate.

A material selected from the group of materials of the group IV semiconductors (germanium, silicon or germanium/silicon alloys) or the group III/V semiconductors (GaAs/AlGaAs, InP/InGaAsP) is suitable for the substrate. In principle, however, other materials can also be used for the substrate of an integrated optical circuit in accordance with the present invention.

Aluminum, gold, silver and copper as well as silicides and titanium nitrite enter into consideration as material for the layer of high conductivity. In order to improve the adherence between the conductive layer and the optically transparent layer, an adherence layer, for instance of PSG $[(SiO_2)_x(P_2O_5)_y]$ can be applied after the application of the metallic conductive layer. This is a process which is known per se in semiconductor technology. PSG is optically transparent and permits the subsequent application of layers of glass.

DETAILED DESCRIPTION

Figure 1:
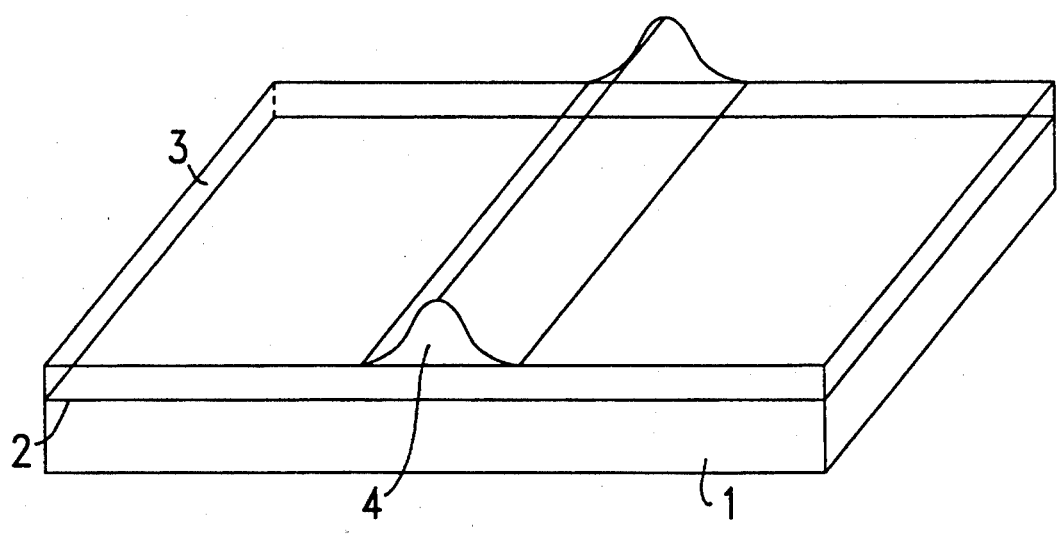
FIG. 1 is an embodiment having an unstructured substrate.

Identical parts in the figures have been provided with the same reference numerals. The layer of high conductivity is referred to below as the conductive layer and the layer of lower index of refraction is referred to also as the dielectric intermediate layer.

In the integrated optical circuit sketched in FIG. 1, a conductive layer 2 and layer 3 of SiO$_2$ of a thickness of 1 μm are applied to the substrate 1. On top of this is the waveguide core 4 of SiO$_2$, for example with phosphorus, the index of refraction of which is greater than the index of refraction of the layer 3 of SiO$_2$. Due to the fact that the index of refraction of the waveguide core 4 is also higher than the index of refraction of the surrounding fluid (air), wave guidance laterally and upward is made possible. A cover layer which may possibly be applied must also have a lower index of refraction than the waveguide core 4.

Figure 2:
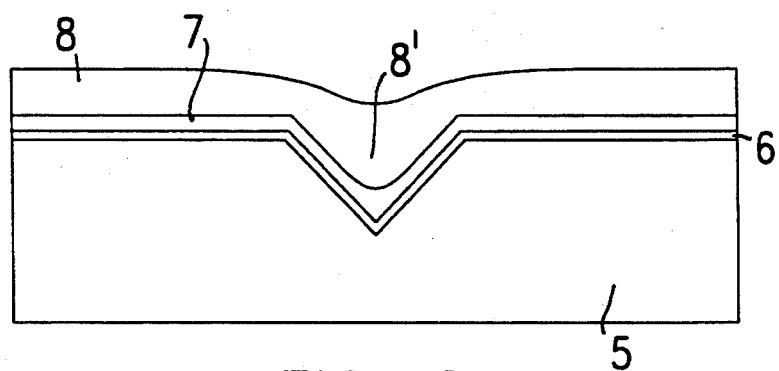
FIG. 2 is an embodiment having a V-groove etching of the substrate (cross section perpendicular to the axis of the waveguide)

One simple possibility of producing waveguides with conductivity insulation consists of a V-groove etching on the substrate, as shown diagrammatically in FIG. 2. After the structuring of the substrate (for instance with a Bragg structure), the conductive layer 6 is applied, it being so thin that the surface of the conductive layer 6 also exhibits the structure. Thereupon, a layer 7 of lower index of refraction and a cover layer 8 which represents the waveguide are applied.

Figure 3:
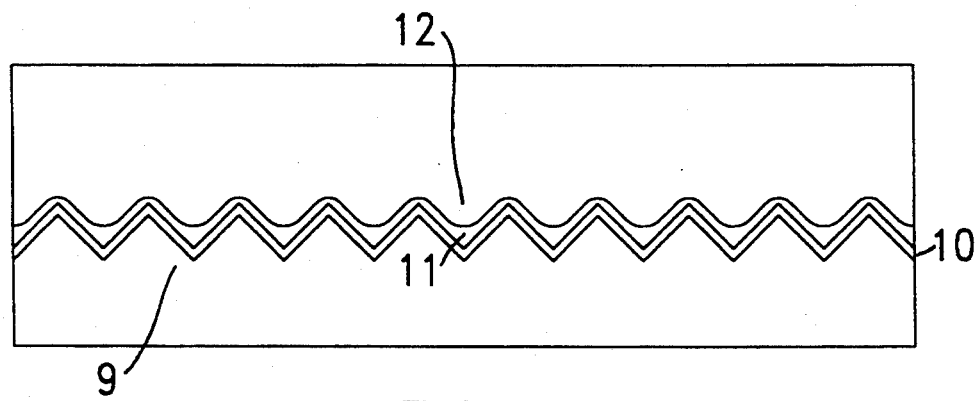
FIG. 3 is a section through a waveguide in the direction of propagation, which forms a Bragg structure.

In the integrated optical circuit of the present invention, Bragg structures can be produced by a suitable structuring of the conductive layer. Thus, for example, the substrate can be provided with the Bragg structure and the conductive layer then applied. An example of this is shown in FIG. 3. A conductive layer 10, a layer 11 of lower index of refraction and a cover layer 12 which serves as waveguide are applied, one above the other, on the correspondingly structured substrate 9.

Figure 4:
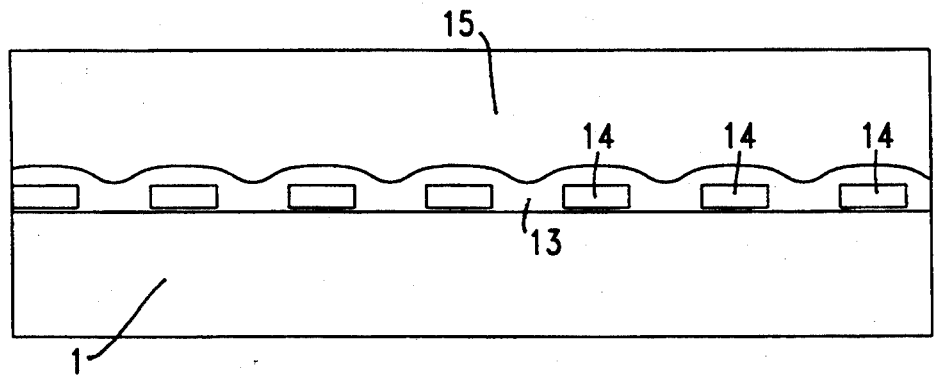
FIG. 4 is a section through a waveguide in the direction of propagation in which a Bragg structure is produced by interruptions of the layer of high conductivity.

If, upon the structuring of the conductive layer, holes or slots are produced in the conductive layer, a waveguide structure is obtained, the cross section of which is shown in FIG. 4 in the direction of propagation, for instance. Periodic interruptions in the conductive layer 14 lead to periodic changes in the effective index of refraction within the waveguide area 15. The dielectric intermediate layer is designated 13.

P-n transitions can be produced on the substrate. If the corresponding diode is switched from the reverse into the forward region, an injection of charge carriers takes place, the result of which is a change in the index of refraction. If the conductive layer is electrically insulated from the substrate by a thin insulating layer, a similar effect changing the index of refraction can be obtained by applying an electric voltage to the conductive layer. The density of the charge carriers is in this case influenced by electrostatic induction. By means of interruptions in the conductive layer, the field and thus the optical transmission properties of the waveguide can be affected thereby.

Figure 5:
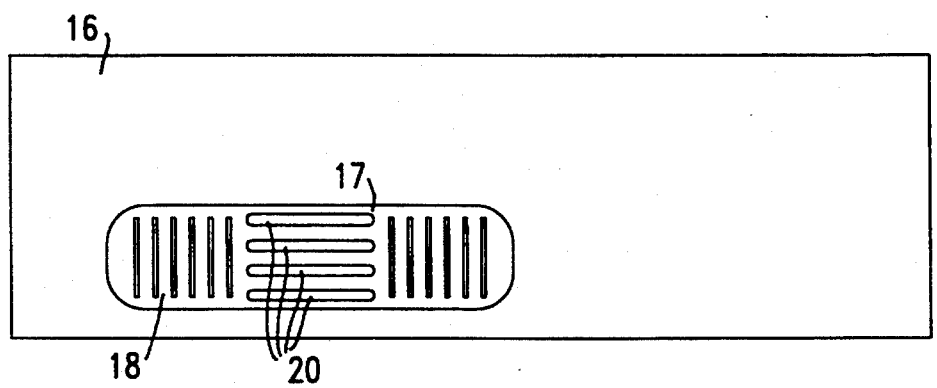
FIG. 5 is a top view of an embodiment which represents a Bragg reflector.

One use of this effect is shown in FIG. 5, in which a conductive layer 17 is applied to a substrate 16. The overlying dielectric intermediate layer as well as the waveguide are not visible in FIG. 5. In a manner similar to that of the embodiment shown in FIG. 3, two Bragg grids 18, 19 are provided between which openings 20 extending in the direction of propagation, are provided in the conductive layer 17. With a variable voltage on the conductive layer 17 with respect to a counterelectrode, not shown in FIG. 5, the index of refraction of the substrate 17 can be varied. In this way, the behavior of the wave filter shown in FIG. 5 can be controlled.

Figure 6:
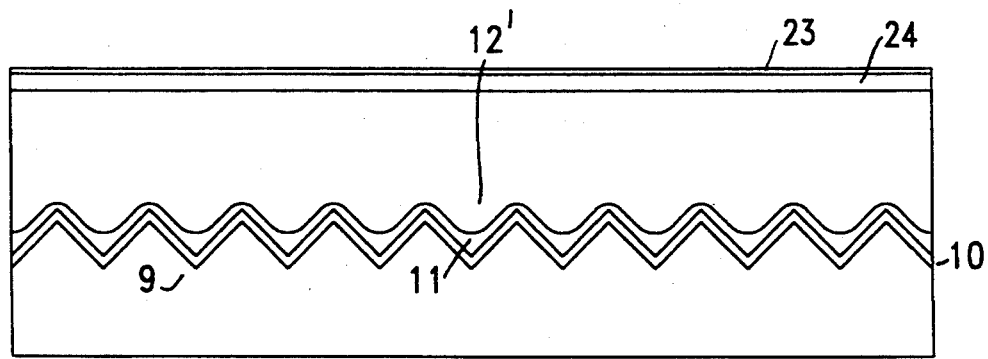
FIG. 6 is a section through another embodiment.

Another possibility for controlling the transmission properties is for the waveguide to consist of a material having an index of refraction which is dependent on the electric field strength. This is true, for instance, of polymers. In this connection, in accordance with FIG. 6, the conductive layer 10 can be used as one electrode, while a conductive layer 23 arranged above the waveguide 12' is used as a counterelectrode. In this case, the conductive layer 23 is also separated from the waveguide 12' by a dielectric intermediate layer 24 in order to avoid disproportionately high attenuation.

In the following, the course of the field will be described, on the basis of FIG. 7, in the case of a known integrated optical circuit and in the case of the integrated optical circuit of the invention. In this connection, the layer thicknesses are drawn approximately to scale but the field strengths are shown with the small values exaggerated in order to be able to show the latter at all. In all cases a waveguide having a thickness of 5 μm is assumed.

Figure 7A:
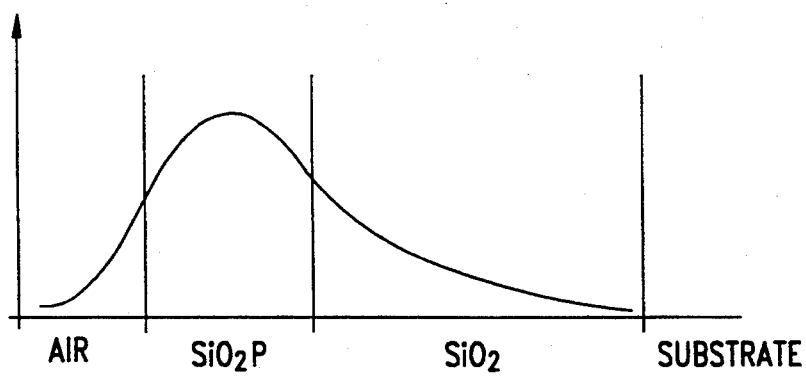
FIGS. 7a and 7b are graphs showing field strength in prior art waveguides.

In the known integrated optical circuit shown in FIG. 7a, a layer of, for instance, 10 μm of lower index of refraction is provided for the wave guidance. The field strength gradually fades away in this layer. On the surface of the layer of lower index of refraction which is further away from the waveguide, the field strength is almost 0, resulting in only slight attenuation in the light guide. As mentioned at the start, such thick layers are difficult to produce with the technologies used in the semiconductor technology. On the other hand, optical coupling to the substrate presents difficulties.

Figure 7B:
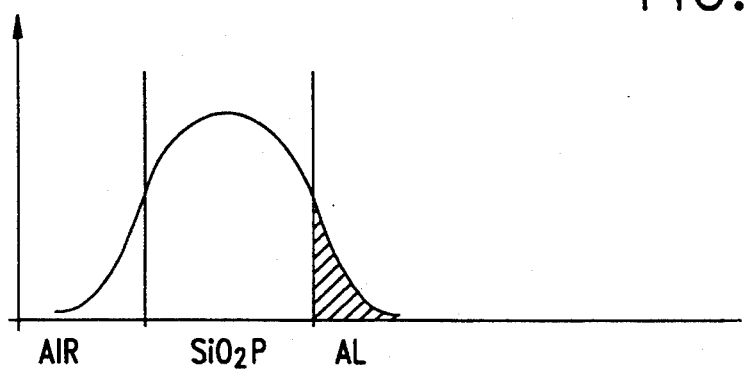

A wave guidance with a conductive layer such as effected, for instance, in hollow conductors, means, however, an extremely high attenuation in the waveguide, which is shown diagrammatically in FIG. 7b. In this case, a metal layer of aluminum (Al), in which high losses occur due to the high field strength, adjoins the waveguide of SiO$_2$P.

Figure 7C:
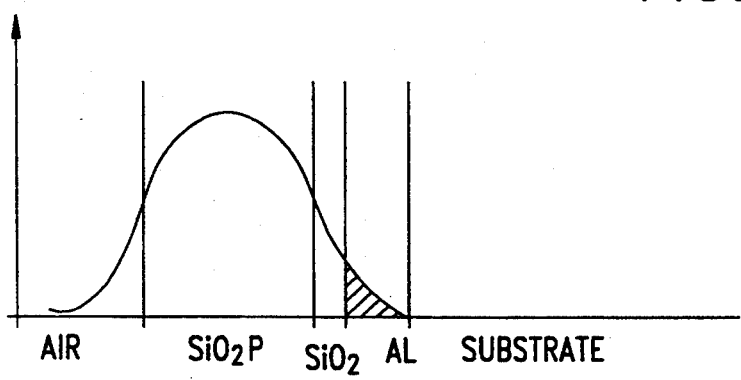
FIGS. 7c and 7d are graphs showing field strength in the integrated optical circuit of the present invention.

In the layer construction of the integrated optical circuit of the invention which is shown in FIG. 7c, a dielectric intermediate layer of SiO$_2$ of a thickness of about 1 μm is provided, adjoining which there is a thin aluminum layer Al. Due to the action of the intermediate layer, the field strength in the aluminum is so greatly reduced as compared with FIG. 7b that the losses are limited to values which can be accepted with the lengths of waveguides used in integrated optical circuits. Both the conductive layer of metal, which may, for instance, be 0.1 μm thick, and the dielectric intermediate layer can easily be applied by known methods.

Figure 7D:
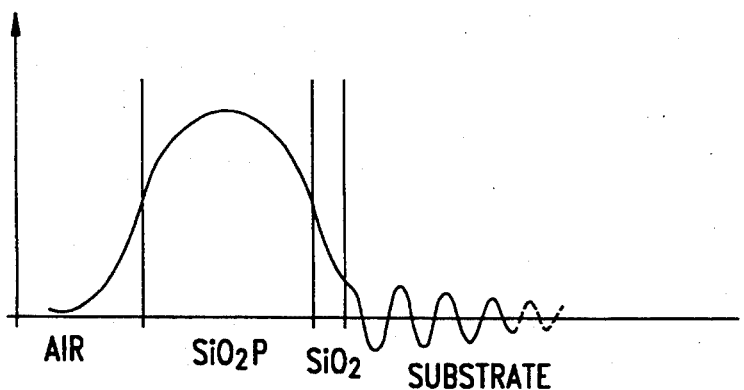

For the coupling of the waveguide to an opto-electrical component present in the substrate, the conductive layer is interrupted. The course of the field then produced in the substrate is indicated in FIG. 7d. In this case, the field continues into the substrate material in oscillating fashion with relatively little attenuation. In this way, a good coupling of opto-electrical components is possible. The attenuation of the waveguide is positively increased at this place, as upon every uncoupling of energy.

I claim:

1. An integrated optical circuit with a waveguide having a waveguide core arranged on a substrate, the integrated optical circuit comprising:
   a layer of high conductivity between the substrate and the waveguide core; and
   a layer of lower index of refraction than the waveguide core between the layer of high conductivity and the waveguide core;
   wherein the layer of high conductivity has openings for optically evanescently coupling the waveguide core with opto-electronic elements arranged in the substrate and wherein the layer of lower index of refraction is uninterrupted.

2. The integrated optical circuit according to claim 1, wherein the layer of lower index of refraction has a thickness $\leq 2$ μm.

3. The integrated optical circuit according to claim 1, wherein the layer of high conductivity includes a metallic material.

4. The integrated optical circuit according to claim 1, wherein a wave field in the waveguide core is conducted dielectrically in a direction parallel to a surface of the substrate.

5. The integrated optical circuit according to claim 1, wherein a wave field in the waveguide core is conducted dielectrically in a direction away from a surface of the substrate.

6. The integrated optical circuit according to claim 1, wherein the substrate includes at least one indentation with a depth greater than the thickness of the layer of high conductivity.

7. The integrated optical circuit according to claim 1, wherein the substrate has a flat surface and the layer of high conductivity includes at least one interruption.

8. The integrated optical circuit according to claim 1, wherein the openings in the layer of high conductivity control wave guidance.

9. The integrated optical circuit according to claim 1, wherein the openings in the layer of high conductivity form a Bragg reflector.

10. The integrated optical circuit according to claim 1, wherein the waveguide core comprises a material with an index of refraction which depends on an electric field strength, and the layer of high conductivity and a second conductive layer form electrodes for the feeding of the electric field.

11. The integrated optical circuit according to claim 10, further comprising a second layer of lower index of refraction than the waveguide core between the second conductive layer and the waveguide core.

12. An integrated optical circuit with a waveguide having a waveguide core arranged on a substrate, the integrated optical circuit comprising:
   a layer of high conductivity between the substrate and the waveguide core;
   a layer of lower index of refraction than the waveguide core between the layer of high conductivity and the waveguide core;
   the layer of high conductivity having openings for optically coupling the waveguide core with optoelectronic elements arranged in the substrate; and
   wherein apertures in the layer of high conductivity form a Bragg reflector.

13. An integrated optical circuit with a waveguide having a waveguide core arranged on a substrate, the integrated optical circuit comprising:
   a layer of high conductivity between the substrate and the waveguide core;
   a layer of lower index of refraction than the waveguide core between the layer of high conductivity and the waveguide core;
   the layer of high conductivity having openings for optically coupling the waveguide core with optoelectronic elements arranged in the substrate;
   wherein the waveguide core comprises a material with an index of refraction which depends on an electric field strength, and the layer of high conductivity and a second conductive layer form electrodes for the feeding of the electric field.

14. The integrated optical circuit according to claims 13, further comprising a second layer of lower index of refraction than the waveguide core between the second conductive layer and the waveguide core.

* * * * *